United States Patent
Root, Jr.

(10) Patent No.: US 7,934,651 B2
(45) Date of Patent: May 3, 2011

(54) INTUITIVE TACTICAL DECISION DISPLAY

(75) Inventor: George Raymond Root, Jr., Gambrills, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 491 days.

(21) Appl. No.: 11/945,143

(22) Filed: Nov. 26, 2007

(65) Prior Publication Data
US 2009/0223354 A1    Sep. 10, 2009

(51) Int. Cl.
*G06F 19/00* (2006.01)
(52) U.S. Cl. ........ 235/404; 235/400; 235/408; 235/410; 235/414
(58) Field of Classification Search .................. 235/404, 235/400, 408, 410, 414
See application file for complete search history.

(56) References Cited

U.S. PATENT DOCUMENTS
3,573,823 A * 4/1971 French ............................ 342/43
5,682,006 A * 10/1997 Perry et al. .................... 89/41.01
* cited by examiner

*Primary Examiner* — Karl D. Frech
(74) *Attorney, Agent, or Firm* — DeMont & Breyer, LLC

(57) ABSTRACT

A method is disclosed for providing an observer with an intuitive sense of the tactical situation in an operational area that surrounds a point-of-interest. The observer is simultaneously presented a top-down view of the operational area that includes contact indicators for each of one or more contacts within the operational area, and a status display that indicates the instantaneous hostility assessment of one or more of these contacts. In addition, the operator is automatically presented historical information, including contact images, for each contact whose hostility assessment exceeds a threshold level. The operator, or a group of operators, is enabled to view all of the displayed information from a single vantage point, assess the relative hostility of numerous contacts simultaneously, and rapidly confirm the identity of apparently hostile contacts prior to engagement.

24 Claims, 5 Drawing Sheets

| Target | Target Description/ Nationality | # of Reports | Target Track Data | Contact Hostility Status | | | | Group Hostility Status | | | |
|---|---|---|---|---|---|---|---|---|---|---|---|
| | | | Course/Speed | Intent | Opportunity | Capability | Intell | Group | Intent | Opportunity | Capability |
| F | Fishing/USA | 0 | 180/5 | 0 | 25 | 0 | | V | | | |
| B | Gunboat/Unknown | 4 | 150/40 | 48 | 57 | 90 | AA | I | | | |
| E | Cargo/Unknown | 2 | 300/8 | 25 | 14 | 50 | | II | 35 | 15 | 60 |
| A | Gunboat/Unknown | 3 | 120/42 | 41 | 15 | 85 | | II | 35 | 15 | 60 |
| G | Gunboat/Canada | 1 | 150/40 | 10 | 16 | 74 | | III | | | |

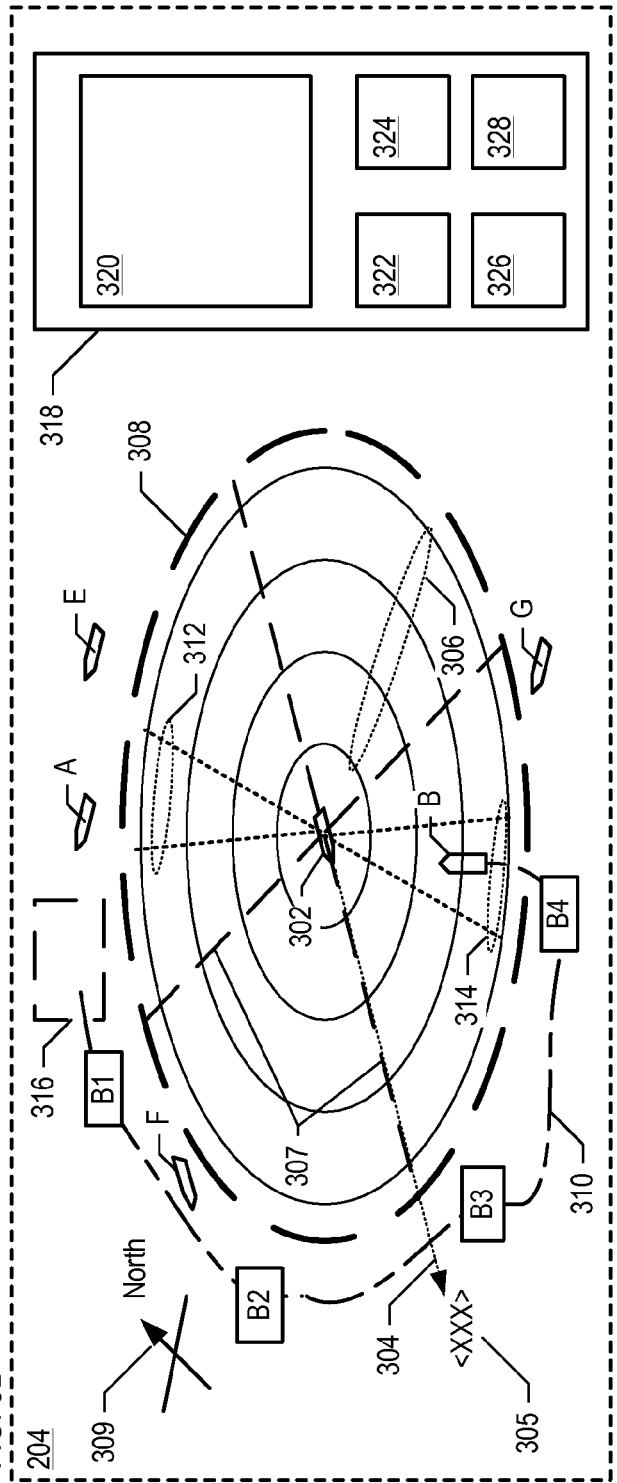

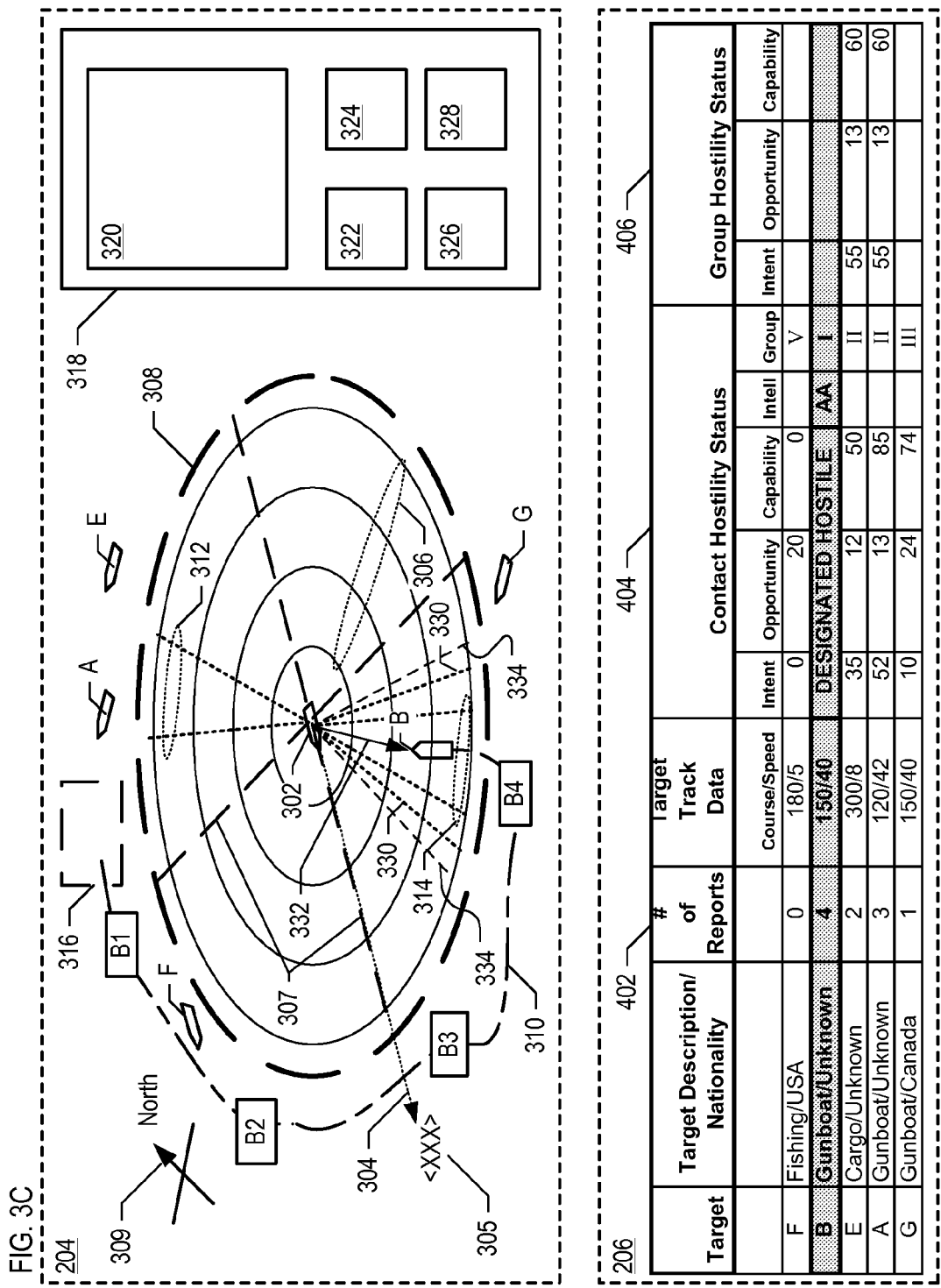

INTUITIVE TACTICAL DECISION DISPLAY

FIELD OF THE INVENTION

The present invention relates to command and control displays in general, and, more particularly, to decision displays and tactical decision aids.

BACKGROUND OF THE INVENTION

In modern warfare, command and control (C2) systems are found in warships, aircraft, tanks, and other land vehicles. These C2 systems are used for, among other things, the deployment of friendly assets and control of sensors and weaponry during military operations. A typical C2 system includes processing elements, communications elements, and control elements. Using a variety of displays, these elements provide information about a tactical environment to one or more observers. Each observer might monitor one aspect (or a few aspects) of the overall tactical situation and communicate about that aspect with other observers. As a result, a "community awareness" is cooperatively developed, which leads to a tactical decision.

In a large set-piece military operation, such as a battle between large warships, C2 systems such as these might suffice. Increasingly, however, asymmetrical battles are becoming more commonplace. In an asymmetrical battle, one or more smaller, typically high-speed platforms engage a larger more powerful platform. For example, a coordinated attack by a large group of high-speed small boats might be used to overwhelm the defenses of a larger, more powerful naval foe. Such an attack might take place while a warship is moving and the normal C2 personnel are manning their control stations. Alternatively, an asymmetrical attack might take place while a defending warship is stationary, during a time when weapons, sensors, and C2 systems are more likely to be manned at a reduced level; for example, when the warship is in port and anchored or tied to a pier.

To further complicate matters, new tactical and strategic sensing systems provide an ever-increasing amount of information to the C2 center. This flow of information must be rapidly assimilated by the C2 personnel who are responsible for making tactical decisions. These sensing systems include multiple sources on-board a host warship (i.e., the warship which contains the command and control system) as well as sources located external to the host warship. On-board sources might include low- and high-resolution infrared (IR) sensors, forward looking infrared (FLIR) sensors, low and high resolution Electro-optical (EO) visual spectrum sensors, Radars, Ladars, and/or Electronic Signal Monitoring (ESM) devices. External sources might include friendly vessels, shore based observers, Unmanned Aerial Vehicles (UAV's), Unmanned Surface Vehicles (USV's), satellites and/or other intelligence assets.

In addition, conventional C2 systems are susceptible to corruption of a radar track by transference between a suspected hostile contact and a neutral or friendly contact. Such transference can occur during long-term monitoring of a suspected hostile contact. In many cases, while a radar track of a suspected hostile contact is being monitored, it "merges" on a radar display with that of a non-hostile contact. As a result, the radar tracks can not be resolved by available radar tracking algorithms. When this occurs, the radar tracks of the two contacts are indistinguishable from that point onward. In order to reconfirm the identities of the two contacts, additional intelligence resources must be allocated. In environments where there are numerous radar tracks and several of the tracks simultaneously begin to converge on a defending host platform, there is usually insufficient time to reconfirm the identity of previously determined hostile contacts. As a result, C2 personnel are faced with the dilemma of having to consider engaging a contact that is no longer confirmed as hostile or allowing the contact to close to a range where there might be insufficient time to engage it.

Once the tactical situation has been assessed and tactical decisions have been made, it is equally difficult with conventional C2 systems to reliably disseminate decisions and their associated action assignments. In the face of an attack by a significant number of high-speed small boats, for example, the C2 process would be a near continuum of detection, identification, tracking, targeting, engagement, and engagement assessment events that would quickly overload the C2 center's ability to organize a defense of the host warship.

A means for improving the ability of C2 personnel to assimilate incoming sensor information, rapidly develop an awareness of an overall tactical situation, and disseminate tactical decisions, therefore, is desirable.

SUMMARY OF THE INVENTION

The present invention enables an operator and/or observer to gain an intuitive and rapid understanding of the tactical situation surrounding a tactical platform or point-of-interest, such as a warship, aircraft, fixed installation, spacecraft, or motor vehicle. For example, embodiments of the present invention are particularly well-suited for providing an operator/observer to command and control defense assets in the face of an attack by a large number of fast attack craft, such as fast gun boats.

Embodiments of the present invention, like the prior art, display information pertaining to a region-of-interest, such as radar data, ESM data, and Information Friend or Foe (IFF) data, engagement status data, threat assessment data, and the like. In the prior-art, this information is displayed on separate tactical displays that each displays information from only a single sensing system. As a result, the entirety of the C2 information is distributed over several displays. This complicates the tactical decision making process due to the challenges of observing, organizing, and distributing all the available sensing information into a single coherent and manageable view of the tactical environment. The difficulty in assessing a tactical situation is exacerbated when a reduced number of C2 personnel are on station in the C2 center.

In contrast to the prior art, embodiments of the invention present tactical information to the observer in a single, integrated display. This integrated display is displayed in a single display area observable by a single observer or groups of observers. As a result, observers are able to quickly develop an intuitive awareness of the tactical situation that surrounds the warship. This enables them to quickly assign additional sensors and/or weapons to counter an attack. In some embodiments, the display provides both the tactical status of the attackers and the ship's sensor and weapon resources being assigned to counter the attackers.

Embodiments of the present invention enable an improved assessment of future hostile group behavior by providing information to an observer regarding collaborative behavior between multiple sensor contacts. In some embodiments, indicators of group behavior, such as a simultaneous change of course, the use of similar navigation routes, or convergence on the same geographical location, are provided to the observer.

In some embodiments, the present invention mitigates a limitation of prior art C2 systems regarding long term monitoring of multiple contacts. Prior-art C2 systems are not well-equipped to keep track of the identity and tactical status (i.e., friend, foe, or neutral) of the radar tracks for contacts identified during a long term observation of multiple potential threats. Such information can enable the subsequent detection and substantiation of patterns of behavior that can determine hostile intent; an important criterion for engaging a potential threat. In contrast to the prior art, the present invention enables an increase in the confidence level for the identity of a contact. The hostility of a contact is typically assessed by a radar tracking algorithm based on the contact's radar track. In some embodiments, the present invention augments this assessment by displaying images of the contact taken at different times and positions on its radar track. These images are displayed in a single display area. In some embodiments, this display area also displays information from additional intelligence resources. This is especially beneficial in cases wherein the radar track of a suspected hostile contact might have merged with that of an unknown or friendly contact.

In some embodiments, some or all radar tracks for potential hostile contacts are provided in the display area. As a result, C2 personnel are enabled: (1) to more quickly and reliably determine the tactical status of a single radar track or group of radar tracks; and (2) to make and disseminate correct tactical decisions regarding those tracks. Additionally, C2 personnel are enabled to review some or all information available for a specific radar track to facilitate verification of a contact prior to engagement.

An embodiment of the present invention comprises a method comprising: displaying a depiction of a region of interest in a first display area, wherein the depiction comprises a first contact indicator that corresponds to a first contact within the region-of-interest; displaying a first hostility indicator in a second display area, wherein the first hostility indicator corresponds to the first contact; and co-locating the first display area and the second display area.

BRIEF DESCRIPTION OF THE DRAWINGS

FIG. 3B depicts a schematic diagram of integrated tactical decision display 204, during operation in decision mode, in accordance with the illustrative embodiment of the present invention.

FIG. 3C depicts a schematic diagram of integrated tactical decision display 204, during operation in engagement mode, in accordance with the illustrative embodiment of the present invention.

FIG. 4B depicts a schematic diagram of integrated contact status display 206, during operation in decision mode, in accordance with the illustrative embodiment of the present invention.

FIG. 4C depicts a schematic diagram of integrated contact status display 206, during operation in engagement mode, in accordance with the illustrative embodiment of the present invention.

DETAILED DESCRIPTION

Figure 1:
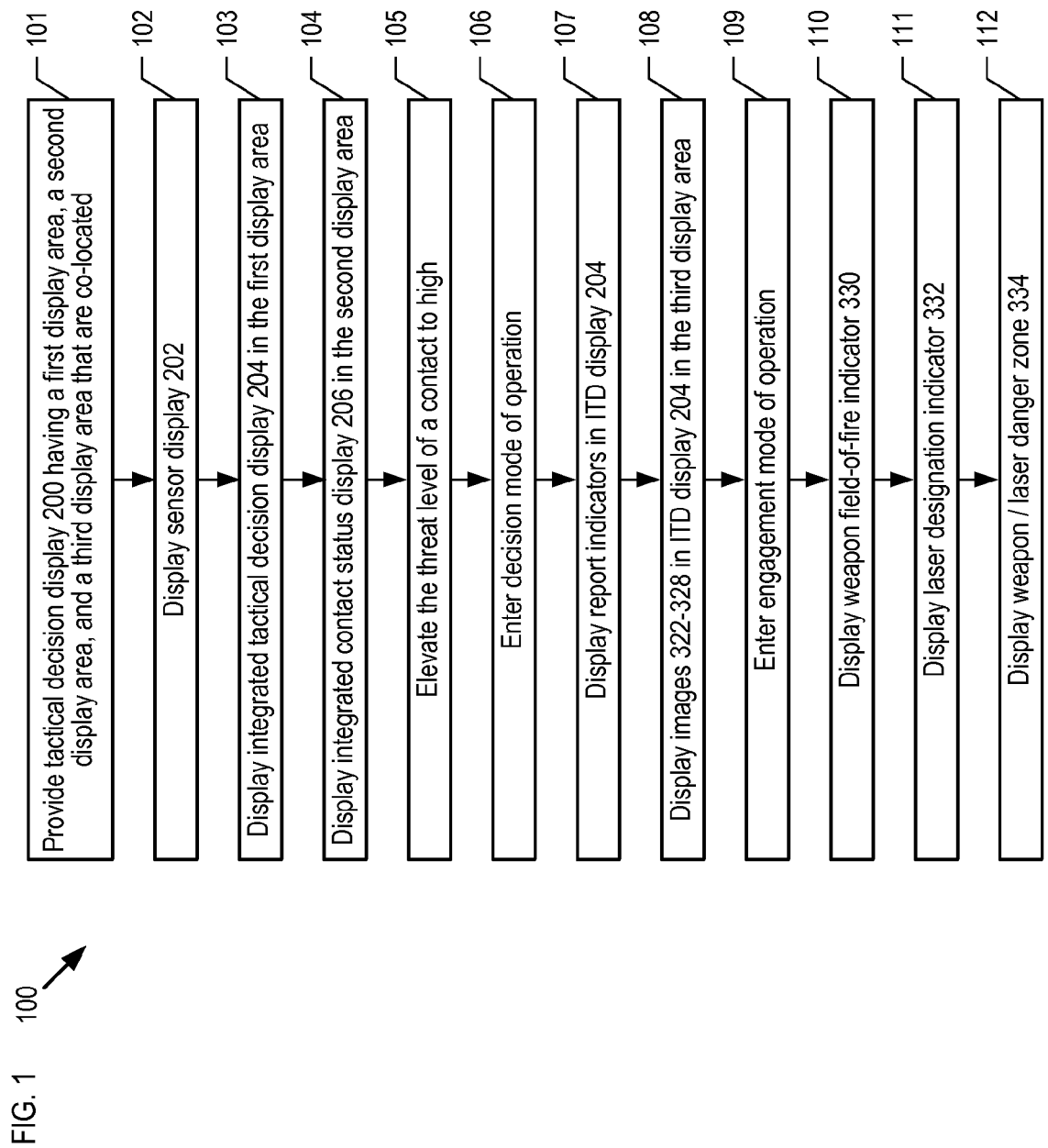
FIG. 1 depicts a method for displaying information in accordance with an illustrative embodiment of the present invention.

The following terms are defined for use in this Specification, including the appended claims:

azimuth means the horizontal component of a direction, measured clockwise around the horizon, from a reference direction.

co-located means physically arranged to enable observation from a single vantage point. Objects that are co-located may be at least partially coincident, side by side, or arranged near one another in a non-linear manner.

contact means a moving or fixed object that reflects radio waves generated by a radar transmitter, thereby generating a radar contact or radar track. Examples of contacts include, without limitation, aircraft, ships, motor vehicles, weather formations, terrain, buildings, and the like.

radar data means location, direction, speed, and/or track of a contact or each of a set of contacts.

radar image means a rendering of the range and azimuth information for contacts within a region-of-interest.

report means a stored record of information corresponding to an individual contact that is collected from some sensor other than a primary tracking system, such as Unmanned Air Vehicles (UAVs), manned aircraft, Unmanned surface vessels (USV), manned surface vessels, and the like. A report may include one or more of the following: a visible image, an infrared image, an ESM signature, acoustic signature, Gaussian signature, ladar information, sensor information, and the like. Associated with a report is the primary track data, which includes location, orientation, relative position, time, heading, etc.

tactical information means information about a contact. Tactical information includes one or more of the following: a contact's track history, a contact's threat level, a contact's weaponry, historical group-related activity of a contact, historical information for a contact, a contact's track history relative to track histories of other vessels, a contact's track history relative to the point-of-interest, and the like. Tactical information can also include other information deemed pertinent by those of ordinary skill in the art. Historical information includes one or more of the following: photographs taken of the contact and the times at which they were taken, a contact's geographical position when designated hostile, a contact's photo history, and the like. Historical information can also include other information deemed pertinent by those of ordinary skill in the art.

track data means data obtained from or derived from a primary tracking sensor. Track data corresponding to a contact typically includes such information as absolute position, time at position, position relative to a point-of-interest, and the like.

common operational picture means a depiction of the tactical situation surrounding a point of interest that is shared by one or more tactical platforms such as a warship or more than one observer on the same tactical platform. The depiction includes one or more of the following: radar images, tactical information, track data and reports regarding the contacts in the vicinity of the point of interest as defined herein.

engagement plot means a graphical depiction of the information necessary for an observer to manage track data and to direct sensors, laser designators, and/or weapons (including both lethal and non-lethal) in the tactical prosecution of a contact.

contact hostility indicators means the set of criteria used to determine the potential or realized hostility of any contact or group of contacts against the point of interest warship or other platform. Such indicators are routinely used by law enforcement and military forces as the basis for their Rules-of-Engagement in the application of force (especially lethal force). In some embodiments, the contact hostility indicators would include:

capability to inflict damage or otherwise harm the warship (i.e. weapons or explosives onboard the contact)

intent to inflict damage or otherwise harm the warship (i.e. the planned intentions of the contact's crew or remote controllers)

opportunity to inflict damage or otherwise harm the warship (i.e. the current or future geographical proximity of the contact to the warship during which capability could be exercised)

intelligence based information regarding the contact's capability, intent, or opportunity to inflict damage or otherwise harm the warship.

FIG. 1 depicts a method for displaying information in accordance with an illustrative embodiment of the present invention. Method 100 comprises operations suitable for providing tactical information corresponding to a region-of-interest that surrounds a point-of-interest. In the illustrative embodiment, the region-of-interest is an operational area that surrounds a host warship (i.e., the point-of-interest). It will be apparent to those of ordinary skill in the art that the region-of-interest may be an area that includes a different point-of-interest or an area that does not include a point-of-interest at all. Method 100 is described herein with reference to FIGS. 2, 3A-C, and 4A-C.

Method 100 begins with operation 101, wherein tactical decision display 200 (hereinafter, display 200) is displayed.

Figure 2:
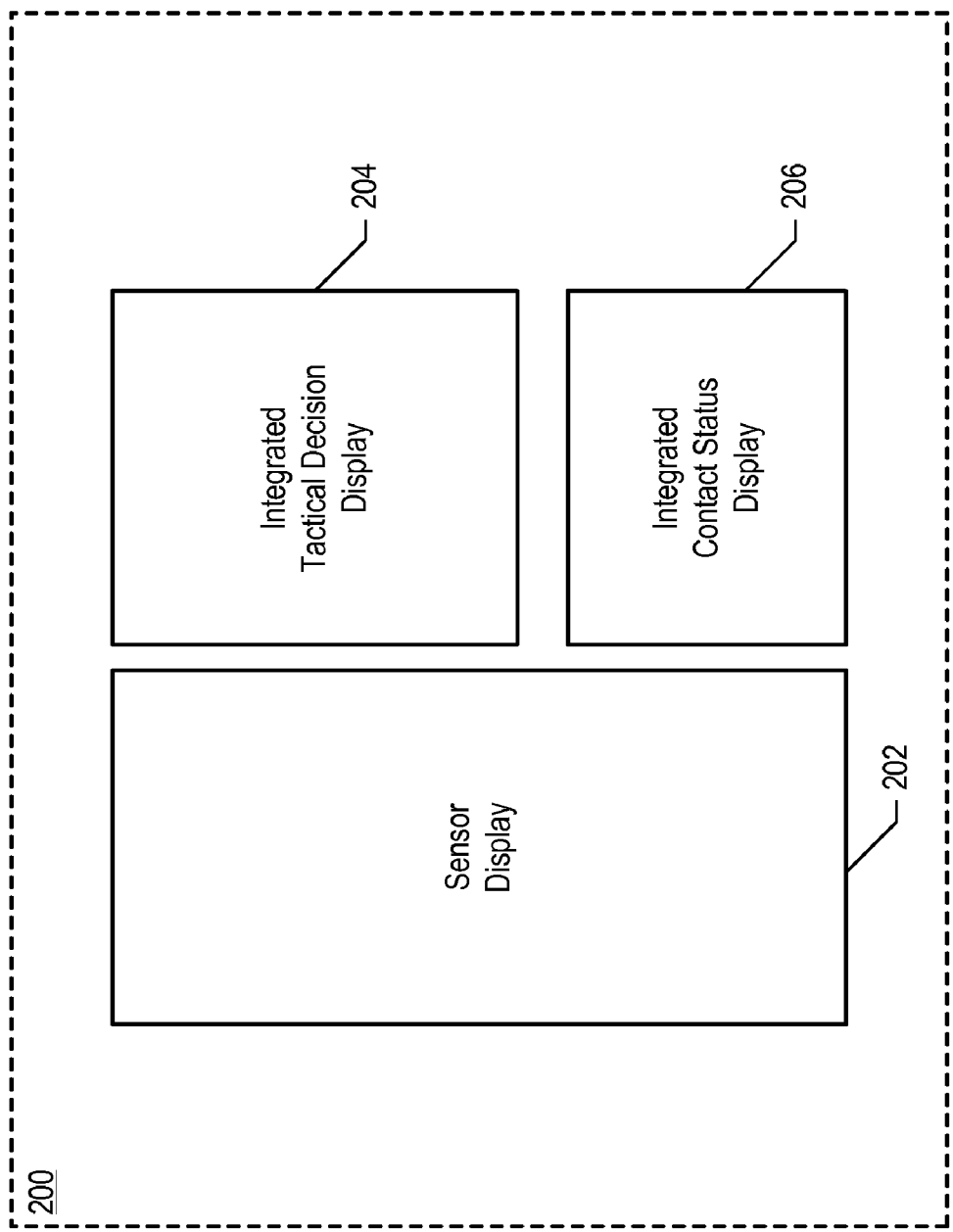
FIG. 2 depicts a schematic diagram of details of a tactical decision display in accordance with the illustrative embodiment of the present invention.

FIG. 2 depicts a schematic diagram of details of a display 200 in accordance with the illustrative embodiment of the present invention. Display 200 is an area for displaying tactical information deemed pertinent by one skilled in the art during at least three modes of operation; a tracking mode, a decision mode, and an engagement mode.

Tracking mode is a mode of operation during which the relative position, behavior, and group dynamics of one or more contacts within the region-of-interest are tracked and assessed.

Decision mode is a mode of operation during which a tactical decision regarding one or more contacts within the region-of-interest is made. For example, it might be necessary to direct a weapon to target a contact whose behavior is considered threatening to the host warship.

Engagement mode is a mode of operation during which a contact within the region-of-interest might be engaged by a friendly asset, such as a weapon, interference vessel, or boarding party.

Display 200 comprises an area for displaying sensor display 202, an area for displaying integrated tactical decision display 204 (hereinafter, ITD display 204), and an area for displaying integrated contact status display 206 (hereinafter, ICS display 206). In display 200, the areas for sensor display 202, ITD display 204 and ICS display 206 are co-located. In other words, the areas within display 200 for displaying sensor display 202, ITD display 204 and ICS display 206 are arranged in a manner that enables them to be viewed from a single vantage point. In some embodiments, at least some of the displays are arranged side by side. In some embodiments, at least some of the displays are arranged one above another. In some embodiments, at least some of the displays are nested within one another.

Display 200 provides areas for displaying information about objects and vessels in an environment, such as an operational area, that surrounds a naval host warship (i.e., a point-of-interest). In some embodiments, display 200 provides areas for displaying information about one or more objects or vessels in an environment that surrounds a point-of-interest that is not a naval host warship, such as an aircraft, fixed installation, motor vehicle, space vehicle, and the like.

Types of information typically desired by one skilled in the art in order to make tactical decisions includes such information as:

i. a common operational picture; or
    ii. an engagement plot; or
    iii. track history and/or status of vessels, aircraft, or other vehicles; or
    iv. weapon information; or
    v. laser designator information; or
    vi. systems status; or
    vii. video; or
    viii. information about the hostility of one or more objects or vessels; or
    ix. any combination of i, ii, iii, iv, v, vi, vii, and viii.

Display 200 enables the integration of tactical information provided by radar, ESM, infra-red sensors, and other electro-optic sensors located both on board the host warship and external to the host warship. In some embodiments, display 200 provides areas for integrating and/or displaying information provided by sources such as sensors located on other host warships, unmanned vehicles, sonar equipment, sensors deployed in the environment, software algorithms, intelligence sources, and electronic signal monitoring equipment, and the like.

At operation 102, sensor display 202 is displayed within display 200. Sensor display 202 is an area for displaying operator-defined information. Such information might include hi-resolution images or video of contacts, historical images or video of contacts, infrared sensor output, visual sensor output, a control window for a UAV and associated equipment, or any other information deemed pertinent to one skilled in the art. It enables the operator or observer to augment the information displayed in other areas of display 200. In some embodiments of the present invention, sensor display 202 is not displayed in display 200.

At operation 103, ITD display 204 is displayed within display 200. ITD display 204 displays tactically important information that is combined in a single display. The information provided in ITD display 204 is that which is deemed pertinent to the development of a hostility assessment of one or more contacts by one skilled in the art. ITD display 204 is described in more detail below and with respect to FIGS. 3A-C.

At operation 104, ICS display 206 is displayed within display 200. ICS display 206 provides a text summary of each contact's instantaneous geographical status combined with a textual and/or graphical depiction of its potential hostility. ICS display 206 integrates tactical information from on-board sensors, such as radar, FLIR/EO sensors, and electronic signal monitoring sensors. ICS display 206 also integrates information from externally-located sensors, such as those on UAV's and other friendly vessels, as well as information from intelligence sources. In addition, ICS display 206 provides information derived from software algorithms that:

i. measure the dynamics of each contact; or
ii. assess predicted movement of each contact with relation to all other contacts and the host warship; or
iii. highlight cooperative activities between multiple contacts and identifies cooperating contacts as potentially hostile groups; or
iv. provide assessments of one or more parameters for gauging the hostility status of one or more contacts; or
v. any combination of i, ii, iii, and iv.

ICS display 206 is described in more detail below and with respect to FIGS. 4A-C.

FIGS. 3A-C and 4A-C depict operational states of an ITD display and ICS display during an exemplary sequence of events wherein a vessel within a region of interest displays potentially hostile behavior.

Figures 3A, 4A:
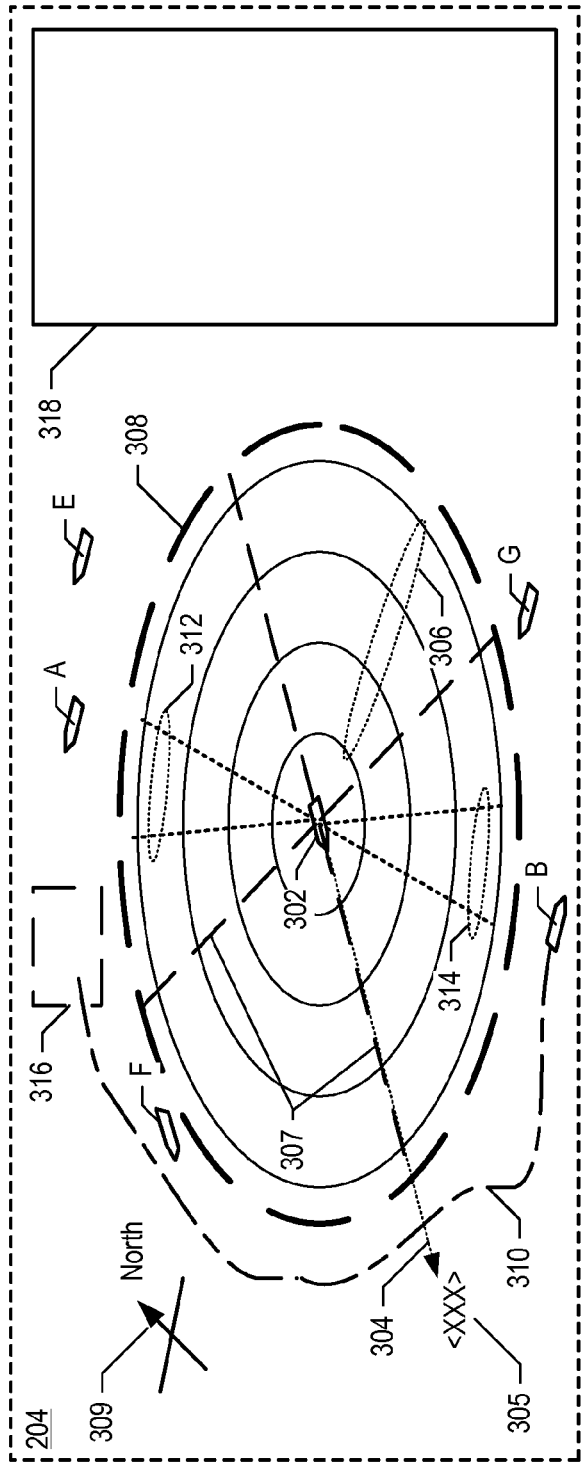
FIG. 3A depicts a schematic diagram of an integrated tactical decision display, during operation in tracking mode, in accordance with the illustrative embodiment of the present invention.
FIG. 4A depicts a diagram of an example of an integrated contact status display, during operation in tracking mode, in accordance with the illustrative embodiment of the present invention.

FIG. 3A depicts a schematic diagram of an ITD display 204, during operation in tracking mode, in accordance with the illustrative embodiment of the present invention. When operating in tracking mode, ITD display 204 is similar to a conventional Common Operational Picture (COP). A COP presents a top-down view, or perspective view, of the operational situation around a host warship. It depicts the host warship, hostile and unknown vessels and regions, and friendly assets within a region of interest for the host warship, such as its operational area, as well as the physical relationship in range and bearing of these entities. A conventional COP also potentially displays other information, such as radar tracks, for one or more user-defined contacts in the operational area.

ITD display 204 comprises point-of-interest symbol 302, directional indicator 304, range markers 306, azimuth indicators 307, exclusion zone marker 308, cardinal heading marker 309, contact track 310, sensor fields of regard 312 and 314, hostile area marker 316, contact information display area 318, and contact symbols A, B, E, F, G.

Point-of-interest symbol 302 is an indicator that marks the position and orientation of the host warship in ITD display 204. Directional indicator 304 extends outward from point-of-interest symbol 302 to indicate the instantaneous direction of travel of the host warship. The numerical indicators <XXX> in FIG. 3A denote the value in degrees of the instantaneous direction of travel of the host warship, with respect to cardinal heading marker 309. For example, the value of <XXX> for the host warship depicted in FIG. 3A is approximately 210 degrees with respect to cardinal heading marker 309. Cardinal heading marker 309 is depicted as indicating true North.

Cardinal heading marker 309 denotes a reference heading, such as a true or magnetic reference orientation, for the point-of-interest. In the illustrative embodiment, cardinal heading marker 309 denotes true North. In some embodiments, cardinal heading marker 309 denotes a reference heading other than true North.

Contact symbols A, B, C, and D are indicators that mark the position and orientation of each of four contacts with respect to the host warship. It should be noted that a contact symbol is typically assigned to each and every contact within the operational area; however, it is not necessary that every contact be marked with a symbol.

Range markers 306 denote user-defined lines of equal range surrounding the host warship and azimuth indicators 307 denote the user defined lines of azimuth emanating from the host warship. Although the azimuth indicators 307 are illustrated spaced at azimuth intervals at 90 degrees, in some embodiments azimuth indicators 307 could be spaced at different intervals.

Exclusion zone marker 308 denotes a user-defined range for exclusion of hostile or unknown vessels. In some embodiments, exclusion zone marker 308 designates the half-range point of the region-of-interest. Exclusion zone marker 308 can be set to designate any desired range and included azimuth from the host warship. Typically, unknown and/or hostile contacts may be considered as displaying hostile intent if they cross exclusion marker 308 and close the range to the host warship.

Contact track 310 denotes a radar track history corresponding to contact B. A contact track history shows the path a contact has taken over a user-definable period of time. It comprises track data that is obtained from a radar system, which functions as the primary tracking sensor for the host warship. In some embodiments, contact track 310 also comprises information derived from track data provided by the primary tracking sensor. Contact track 310 typically comprises information such as the contact's position, relative to the host warship, over a period of time, as well as the time at which the contact was at each of these positions. In some embodiments, contact track 310 is displayed in relative fashion, with respect to the point-of-interest. In some embodiments, contact track 310 is displayed in absolute geographic coordinates. In some embodiments, contact track 310 comprises, or is derived from multiple sources of track data obtained from onboard or off-board tracking sensors that are other than a radar system.

Although ITD display 204 is depicted as showing only a single contact track 310, it should be noted that ITD display 204 is capable of displaying a contact track 310 for more than one contact or displaying no contract track 310.

Sensor fields of regard 312 and 314 each denote a field of regard for one of the sensors the provide information to the C2 center. The information obtained from sensor fields of regard 312 and 314 are displayed in sensor display area 202. Although the illustrative embodiment depicts two sensor fields of regard in ITD display 204, it will be clear to one of ordinary skill in the art, after reading this specification, how to make and use alternative embodiments of the present invention wherein any number of sensor fields of regard are depicted in ITD display 204.

Hostile area marker 316 denotes a geographic area that is a potential or known hostile region. A contact that enters or exits an area designated by hostile area marker 316 is subject to reconsideration of one or more of its contact hostility status indicators.

Report summary display 318 is a region of ITD display 204 for displaying reports corresponding to an operator-selected contact. As will be discussed below, and with respect to FIGS. 3B-C and 4B-C, report summary display 318 enables an operator to increase the probability that the identification of a contact is correct. In some embodiments, report summary display 318 displays one or more of the images that are contained in reports corresponding to a contact of interest. This provides an operator visual information to facilitate confirmation of the identity of a contact. In cases wherein the radar track of a first contact has merged temporarily with the radar track of a second contact, report summary display reduces the potential for contact track data transference between the two contacts.

In some embodiments, contact information display area 318 displays information that includes:

i. video of a contact (visual and/or infrared); or
ii. instantaneous speed of a contact; or iii. instantaneous course of a contact; or
iv. intelligence information corresponding to a contact; or
v. geographic point of origin or point of track initiation; or
vi. geographic track history using information from both on-board and externally-generated intelligence reports; or
vii. photographic information (visual and/or infrared); or
viii. history of hostility assessments made by software algorithms and/or observations of operators using video and photographs of the contact; or
ix. any combination of i, ii, iii, iv, v, vi, vii, and viii.

FIG. 4A depicts a diagram of an example of an ICS display 206, during operation in tracking mode, in accordance with the illustrative embodiment of the present invention. ICS display 206 comprises a single display for displaying, in combined fashion, tactically important information that is deemed pertinent to one skilled in the art. ICS display 206 comprises a text summary of each contact's instantaneous geographical status combined with a graphical depiction of its potential hostility. The tactical information displayed in ICS display 206 includes information provided by:
i. on-board radar, infrared, and electro-optic sensors; or
ii. on-board electronic signals monitoring systems; or
iii. radar, infrared, and electro-optic sensors located on friendly assets and UAV's; or
iv. intelligence resources regarding the potential hostile intent of one or more contacts; or
v. software algorithms that measure each contact's dynamics, assesses each contact's predicted movements with respect to the host warship and other contacts, and/or highlight cooperative activities between multiple contacts and identifies cooperating contacts as hostile groups; or
vi. a file storage system for storing reports corresponding to one or more contacts in the operational area; or
vii. any combination of i, ii, iii, iv, v, and vi.

ICS display 206 comprises a textual representation of information corresponding to each of one or more contacts within the operational area (i.e., contacts A, B, E, F, and G). In particular, ICS display 206 provides the number of reports stored for each of the contacts in display area 402 and hostility status indicators for each contact in display area 404, and the hostility status indicators of each group of contacts in display area 406.

Display area 402 provides a display of the number of reports associated with each of the contacts listed in ICS display 206. A report is a record of sensor information obtained at some point in the history of the contact. Typically a report contains an image of the contact that enables an operator to visually verify both the identity and the hostile capability of that contact at the time the image was taken. Such imagery is particularly advantageous in avoiding track transference between two contacts whose contact tracks may have merged at some point in time. Each report also typically contains position and time information denoting the position of the contact and the time when a record was recorded.

Display area 404 provides: (1) an indication of intelligence information that is available for each individual contact; (2) a group designation for each individual contact within a contact group that might have displayed (or might be displaying) potential group behavior; and (3) contact hostility indicators corresponding to each of the individual contacts listed in ICS display 206.

Intelligence information about a contact includes such information as intelligence reports from remote sensors, contact tracks, areas of suspected hostile operations, electronic signal monitoring information, human intelligence information regarding crew members or suspected cargo on board, and the like.

In accordance with the illustrative embodiment of the present invention, a hostility indicator indicates an assessment of one of three factors: 1) an assessment of intended hostile action (i.e. intent); 2) opportunity for hostile action; 3) capability of hostile action. As discussed below, a hostility indicator can be either a contact hostility indicator or a group hostility indicator. A contact hostility indicator for a specific contact is based on individual characteristics of that contact. A group hostility indicator for a specific contact is based on a collection of characteristics across all members of a group that includes that contact. The numerical value for each hostility indicator is provided by computer algorithms, such as Predictive Situational Awareness (PSA) algorithms. In some embodiments, the value of one or more hostility indicators is determined based on other intelligence information. In some alternative embodiments, a hostility indicator is displayed graphically, rather than numerically. In some alternative embodiments, hostility indicators other than intent, opportunity, and capability are applied in the engagement decision process.

Contact hostility indicators are displayed in display area 404. A contact hostility indicator is based on the individual characteristics of the specific contact to which it pertains. Each of the contact hostility indicators in display area 404 is displayed using a user-defined color code that denotes the level of criticality of the indicator. The color for which an indicator is displayed is user-definable, but is typically chosen to enable an operator/observer to quickly assess the hostility of the individual contact relative to all other contacts listed in ICS display 206.

For example, in the illustrative embodiment, white indicates a low or no level of threat, yellow is used to denote a moderate level of threat, and red is used to denote a high level of threat. For example, yellow is used to denote: an intent indicator having a value between 50-74%; an opportunity indicator for a contact whose range is, or is predicted to be, between 1 to 3 nautical miles; and a capability indicator for a contact having "suspect" capability. Similarly, red is used to denote: an intent indicator having a value of 75% or higher; an opportunity indicator for a contact whose range is, or will be, within 1 mile; and a capability indicator for a contact known to have a dangerous capability onboard.

Group hostility indicators are displayed in display area 406. A group hostility indicator is based on the collective characteristics of a group, including an exhibition of group behavior. Group hostility indicators are commonly applied to each contact considered a potential member of the group to which the indicators pertain. Each of the group hostility indicators in display area 406 is displayed using a user-defined color code. The color for which an indicator is displayed is user-definable, but is typically chosen to enable an operator/observer to quickly assess the hostility of a group. Group hostility indicators are generated by computer algorithms that track group behavior. In some embodiments, the value of one or more group hostility indicators is determined based on other intelligence information.

In some embodiments, ICS display 206 includes hostility indicators of only one type of contact hostility indicators or group hostility indicators.

For both the contact and group hostility indicators, the levels at which a value of an indicator passes from low to moderate to high concern are user-definable.

At operation 105, the threat level for contact B is elevated to high. Operation 105 occurs automatically when the value of all contact hostility indicators (and/or group hostility indicators) for contact B exceed the user-defined value that denotes a high threat level for that hostility indicator. For example, in FIG. 4B, all three contact hostility indicators in display area 404 (i.e., Intent, Opportunity, and Capability) have values that exceed the user-defined value of 75%. As a result, contact B is designated as potentially hostile and a possible imminent threat to the warship.

FIG. 4B depicts a schematic diagram of ICS display 206, during operation in decision mode, in accordance with the illustrative embodiment of the present invention.

In decision mode, row 408, which represents contact B in ICS display 206, is annotated to inform the operator/observer of the possible immanent threat. In some embodiments, the entire row 408 representing contact B in ICS display 206 changes color to red. In some embodiments, row 408 flashes and/changes to a color other than red. In some embodiments, the position of row 408 within ICS display 206 is changed (e.g., to the top or bottom of the list of contacts, etc.). In some embodiments, all the contact lines in ICS display 206 are organized from top or bottom, or bottom to top, by their cumulative relative threat level. In some embodiments, an audible alarm is also generated. In some embodiments, each row pertaining to such a contact is highlighted by visual means, such as emboldening all text in the row, displaying all text in the row in a bright color, displaying all text in the row in a flashing font, and the like. It will be clear to one of ordinary skill in the art, after reading this specification, how to highlight information pertaining to a contact perceived as having a high threat level. In some embodiments, operation 105 is initiated by an operator command.

In some embodiments, each contact that is considered part of the same group as contact B (based on prior group behavior) is highlighted, even if these other contacts are not, themselves, displaying individual threatening behavior.

At operation 106, in response to the high threat level indication, display 200 enters a decision mode of operation. In decision mode, display 200 automatically displays information to alert an operator and enable the operator to determine whether to engage one or more of the contacts considered a high level threat.

FIG. 3B depicts a schematic diagram of ITD display 204, during operation in decision mode, in accordance with the illustrative embodiment of the present invention. In decision mode, ITD display 204 displays an updated contact track 310 that shows contact B has crossed exclusion marker 308 and is closing with the host warship.

At operation 107, report indicators B1, B2, B3, and B4 are added to contact track 310 of ITD display 204. Each of these report indicators denotes geographic locations at which images of contact B have been taken. In some embodiments, the positions of report indicators B1-B4 on contact track 310 also denotes the times at which each report was generated. Together, contact track 310 and report indicators B1 through B4 provide a track history for contact B that is used in an assessment of its hostility level and threat to the host warship. In addition to enabling an operator to make a more informed assessment of a contact's potential threat, these reports also provide a record that can be used to understand, and perhaps justify, actions that were taken during operations. In some embodiments, some or all available report indicators are added to a contact track automatically when the threat level of that contact is elevated to high. In some embodiments, the report indicators are added to the contact track in response to an operator command.

At operation 108, images associated with report indicators B1, B2, B3, and B4 are automatically displayed in report summary display 318. Image 320 is an operator-selectable enlargement of one of images 322-328. The operator/observer uses image 320 to confirm that the identity of the contact has not changed and that previously made observations regarding the contact's capability based hostility indicator are valid. In some embodiments, report summary display 318 is not located within ITD display 204; however, report summary display 318 and ITD display 204 are co-located.

In some embodiments, report indicators denote reports that include information such as:
 i. an image of a contact (e.g., photographic or infrared, etc.); or
 ii. correlations with other reports; or
 iii. position relative to the point-of-interest; or
 iv. position of the contact in absolute coordinates; or
 v. a color code denoting the contact's risk assessment at the time of the report; or
 vi. any combination of i, ii, iii, iv, and v.

In some embodiments, the report indicators and their images are not automatically displayed in ITD display 204, but, instead, are displayed upon operator command.

At operation 109, display 200 begins operation in engagement mode in response an operator command. In some embodiments, display 200 enters engagement mode automatically based on pre-determined threat criteria.

FIG. 3C depicts a schematic diagram of ITD display 204, during operation in engagement mode, in accordance with the illustrative embodiment of the present invention.

At operation 110, ITD display 204 displays weapon field-of-fire indicator 330, which represents the kinematic range of a weapon that might be used to engage contact B.

At operation 111, ITD display 204 displays laser designation indicator 332, which represents the direction in which a laser designator is aimed.

At operation 112, ITD display 204 displays weapon/laser danger zone indicator 334. Weapon/laser danger zone indicator 334 represents a zone to be avoided by friendly or neutral forces that would be endangered by a laser and/or weapon that might be used to engage contact B.

FIG. 4C depicts a schematic diagram of ICS display 206, during operation in engagement mode, in accordance with the illustrative embodiment of the present invention. In engagement mode, ICS display 206 continues to highlight the row associated with contact B.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
 displaying a depiction of a region of interest in a first display area, wherein the depiction comprises a first contact indicator that corresponds to a first contact within the region-of-interest;
 displaying a first hostility indicator in a second display area, wherein the first hostility indicator corresponds to the first contact; and
 co-locating the first display area and the second display area.

2. The method of claim 1 further comprising displaying a first report indicator in a third display area, wherein the first report indicator denotes a first report corresponding to the first contact, and wherein the third display area and the first display area are co-located.

3. The method of claim 1 wherein the first hostility indicator is displayed as a numerical value, wherein the numerical value represents an assessment of at least one of the first contact's hostile intent, opportunity for hostile action, and hostile action capability.

4. The method of claim 1 further comprising:
displaying a second hostility indicator in the second display area; and
displaying a third hostility indicator in the second display area;
wherein the first hostility indicator indicates an assessment of hostile intent, and wherein the second hostility indicator indicates an assessment of opportunity for hostile action; and further wherein the third hostility indicator indicates an assessment of capability for hostile action.

5. The method of claim 4 wherein the first hostility indicator, second hostility indicator, and third hostility indicators are contact hostility indicators.

6. The method of claim 4 wherein the first hostility indicator, second hostility indicator, and third hostility indicators are group hostility indicators.

7. The method of claim 4 further comprising displaying a first report indicator in a third display area, wherein the first report indicator denotes a first report corresponding to the first contact, and wherein the third display area and the first display area are co-located.

8. The method of claim 7 further comprising displaying a first image in a fourth display area, wherein the first report comprises the first image, and wherein the first image is an image of the first contact, and further wherein the fourth display area and the first display area are co-located.

9. The method of claim 8 further comprising:
establishing a first threshold for the first hostility indicator, a second threshold for second hostility indicator, and a third threshold for third hostility indicator; and
automatically displaying the first report indicator and the first image when the first hostility indicator exceeds the first threshold, the second hostility indicator exceeds the second threshold, and the third hostility indicator exceeds the third threshold.

10. The method of claim 1 further comprising displaying a first report indicator at a first position in the first display area, wherein the first report indicator denotes a first report that contains a first image of the first contact, and wherein the first position denotes the geographic location of the first contact when the first report was obtained.

11. The method of claim 10 further comprising displaying the first image of the first contact in a third display area, wherein the third display area and the first display area are co-located.

12. The method of claim 1 further comprising:
displaying a weapon field-of-fire indicator; and
correlating the weapon field-of-fire indicator and a kinematic range of a weapon.

13. The method of claim 1 further comprising:
displaying a laser designation indicator; and
correlating the laser designation indicator and the aim of a laser designator.

14. A display comprising:
a depiction of a region-of-interest displayed in a first display area, wherein the first depiction comprises a first contact indicator that corresponds to a first contact within the region-of-interest; and
a first hostility indicator displayed in a second display area, wherein the first hostility indicator corresponds to the first contact;
wherein the first display area and the second display area are co-located.

15. The display of claim 14 further comprising a first report indicator that denotes a first report corresponding to the first contact, wherein the first report indicator is displayed at a first position in the first display area, and wherein the first position denotes the geographic location of the first contact when the first report was obtained.

16. The display of claim 15 further comprising the first report, wherein the first report is displayed in a third display area.

17. The display of claim 15, further comprising a second report indicator that denotes a second report corresponding to the first contact, wherein the second report indicator is displayed at a second position in the first display area, and wherein the second position denotes the geographic location of the first contact when the second report was obtained.

18. The display of claim 14 wherein the depiction further comprises:
a first contact track that corresponds to the first contact;
a first report indicator that denotes a first report corresponding to the first contact, wherein the first report indicator is displayed at a first position on the first contact track, and wherein the first position corresponds to the geographic location of the first contact when the first report was obtained.

19. The display of claim 14 further comprising:
a second hostility indicator displayed in the second display area; and
a third hostility indicator displayed in the second display area;
wherein the first hostility indicator indicates an assessment of hostile intent, and wherein the second hostility indicator indicates an assessment of opportunity for hostile action; and further wherein the third hostility indicator indicates an assessment of capability for hostile action.

20. The display of claim 19 wherein the first hostility indicator, second hostility indicator, and third hostility indicator are contact hostility indicators.

21. The display of claim 19 wherein the first hostility indicator, second hostility indicator, and third hostility indicator are group hostility indicators.

22. The display of claim 19 further comprising:
a fourth hostility indicator displayed in the second display area; and
a fifth hostility indicator displayed in the second display area; and
a sixth hostility indicator displayed in the second display area;
wherein the fourth hostility indicator indicates an assessment of hostile intent, and wherein the fifth hostility indicator indicates an assessment of opportunity for hostile action; and further wherein the sixth hostility indicator indicates an assessment of capability for hostile action;
wherein the first hostility indicator, second hostility indicator, and third hostility indicator are contact hostility indicators; and
wherein the fourth hostility indicator, fifth hostility indicator, and sixth hostility indicator are group hostility indicators.

23. A display comprising:
a depiction of a region-of-interest, wherein the depiction is displayed in a first display area, and wherein the depiction comprises a radar image, a first contact indicator that corresponds to a host warship, a second contact indicator that corresponds to a contact within the region-of-interest, and a contact track that corresponds to the contact;

a hostility assessment corresponding to the second contact, wherein the hostility assessment is displayed in a second display area, and wherein the hostility assessment comprises;
  (1) a first hostility indicator that indicates an assessment of hostile intent;
  (2) a second hostility indicator that indicates an assessment of opportunity for hostile action; and
  (3) a third hostility indicator that indicates an assessment of capability for hostile action;

a first report indicator that denotes a first image of the contact, wherein the first report indicator is displayed at a first position in the first display area, and wherein the first position corresponds to the geographic position of the contact at the time the first image was obtained; and a second report indicator that denotes a second image of the contact, wherein the second report indicator is displayed at a second position in the first display area, and wherein the second position corresponds to the geographic position of the contact at time the second image was obtained;

wherein the first display area and the second display area are co-located.

24. The display of claim 23 further comprising the first image and the second image, wherein the first image and the second image are displayed in a third display area, and wherein the first display area, second display area, and third display area are co-located.

* * * * *